United States Patent [19]

Sawamoto

[11] Patent Number: 5,023,777
[45] Date of Patent: Jun. 11, 1991

[54] INFORMATION PROCESSING SYSTEM USING DOMAIN TABLE ADDRESS EXTENSION FOR ADDRESS TRANSLATION WITHOUT SOFTWARE MODIFICATION

[75] Inventor: Hideo Sawamoto, Hadano, Japan

[73] Assignee: Hitachi, Ltd., Tokyo, Japan

[21] Appl. No.: 252,815

[22] Filed: Oct. 3, 1988

[30] Foreign Application Priority Data

Oct. 5, 1987 [JP] Japan ................ 62-250913

[51] Int. Cl.[5] ............... G06F 9/318; G06F 12/06; G06F 12/10; G06F 7/02
[52] U.S. Cl. ..................... 364/200; 364/245; 364/245.31; 364/246.3; 364/252.6; 364/255.1; 364/255.5; 364/255.7; 364/256.3; 364/260.6; 364/955.6; 364/957.1; 364/958.3; 364/970.5
[58] Field of Search ................ 364/200, 900

[56] References Cited

U.S. PATENT DOCUMENTS

| | | | |
|---|---|---|---|
| 3,735,355 | 5/1973 | Balogh, Jr. et al. | 364/200 |
| 3,761,881 | 9/1973 | Anderson et al. | 364/200 |
| 3,976,976 | 8/1976 | Khosharian | 364/200 |
| 4,092,715 | 5/1978 | Scriver | 364/200 |
| 4,307,448 | 12/1981 | Sattler | 364/200 |
| 4,361,868 | 11/1982 | Kaplinsky | 364/200 |
| 4,388,685 | 6/1983 | Kotok et al. | 364/200 |
| 4,500,962 | 2/1985 | Lemaire et al. | 364/200 |
| 4,658,350 | 4/1987 | Eggebrecht et al. | 364/200 |
| 4,796,177 | 1/1989 | Nishimura et al. | 364/200 |
| 4,864,493 | 9/1989 | Kishi | 364/200 |

Primary Examiner—Archie E. Williams, Jr.
Assistant Examiner—Amare Mengistu
Attorney, Agent, or Firm—Fay, Sharpe, Beall, Fagan, Minnich & McKee

[57] ABSTRACT

An information processing apparatus with an address extension function includes a set of address adders for performing address addition with respect to a first fraction of an address for an instruction and/or a data, which fraction corresponds to the not extended bit portion of the address, and a set of domain registers for storing a second fraction of the address for an instruction or an operand, which fraction corresponds to the extended bit portion of the address. If address extension is not made, address translation into a real address is performed using a virtual address obtained through addition operation by the address adder and in accordance with a conventional not address extended program. If address extension is made, address translation into a real address is performed using a virtual address obtained by concatinating the addition result by the address adder with the content of the domain register.

4 Claims, 4 Drawing Sheets

FORMAT OF SEGMENT TABLE ENTRY

FORMAT OF DOMAIN TABLE ORIGIN REGISTER

FORMAT OF DOMAIN TABLE ENTRY

FORMAT OF EXTENDED PAGE TABLE ENTRY

INFORMATION PROCESSING SYSTEM USING DOMAIN TABLE ADDRESS EXTENSION FOR ADDRESS TRANSLATION WITHOUT SOFTWARE MODIFICATION

BACKGROUND OF THE INVENTION

The present invention relates to an information processing apparatus having an address extension function, and more particularly to an information processing apparatus capable of extending an address space while keeping compatibility with already developed softwares.

In a current general purpose computer architecture, an instruction counter, general registers and the like all of 31 bits or 32 bits are generally used. Softwares have been developed also on the basis of 31 bit address. A general purpose computer architecture of this type is discussed, for example, in IBM System 370 Extended Architecture Principles of Operation, SA22-7085-1, 1987, pp 3-21 to 3-38.

Data amount to be processed has increased nowadays, and both virtual and real addresses of 31 bits or more have become necessary. In configuring a new architecture with 31 or more bit addresses, it is important to keep compatibility with those architectures with 31 bit addresses already developed. Namely, it is necessary for an information processing apparatus of a new architecture to be capable of using softwares with 31 bit addresses without any modification.

SUMMARY OF THE INVENTION

It is an object of the present invention to provide an information processing apparatus with address extended architecture and function capable of using softwares developed before the address extension.

In an information processing apparatus, an instruction or data is read using a real address which has been translated from a virtual address obtained by an address generator, i.e., an address adder. A virtual address generally has a segment index, page index and byte index. A segment table origin which is address that designates the beginning of a segment table is added to a segment index. Based on the added result, a page table origin of the segment table which is one of address translation table is obtained. Then, the page table origin, i.e., the start address of a page table which is another address translation table is added to the page index to obtain a page frame real address from the page table. The page frame real address is concatinated with the byte index to obtain a real address.

According to the information processing apparatus of this invention, in order to extend an address space, there is provided a domain index as a higher index of a segment index of the address before the extension, which address is expressed by the segment index, page index and byte index. The domain is a space which is addressed by the address before the extension, and the extended address space consists of multiple domain. There are further provided in the address translation table a domain table, and a domain table designation register which contains the domain table origin. The domain table entry contains the segment table origin. In translating a virtual address into a real address, a domain table origin representing the start address of a domain table is added to a domain index to obtain a domain-table entry address and the entry fetched from the domain table contains the segment table origin in the domain table. Thereafter, the virtual address is translated in the same manner as the case where an address space is not extended.

The information processing apparatus is provided with domain registers for storing domain indexes of an address for an instruction or an operand. Address adders perform address addition for an address before the extension. The contents of the domain registers are set at "0" in case where an address extension is not made. If the content of a domain register is "0", a virtual address outputted from the address adder is translated into a real address in the same manner as conventional. If the content of a domain register is not "0", the virtual address obtained from the address adder is translated into a real address using the segment table origin obtained from the domain table.

The content of a domain register is set by the information processing apparatus, or in the case of address extension the content is sometimes incremented in accordance with the result of address addition. The information processing apparatus is provided with means for storing information based on which the address extension for an instruction and/or an operand is discriminated. If a carry is outputted from the address adder, the carry is neglected, whereas in the case where address extension is made, the content of the domain register is incremented by 1.

If a translation look-aside buffer (TLB) which entry generally contains segment table origin, whole or part of segment index and page index, and page frame addresses is to be used in the information processing apparatus of this invention, TLB further stores domain indexes, and domain table origins in place of segment table origins. In comparing the stored contents in TLB with a virtual address to be translated, the content of a domain register and a domain index field of the TLB entry are compared with each other even when address extension is not made.

According to the present invention, although the quantity of additional hardware is small, including such as additional domain registers, address extension can be easily controlled while keeping compatibility with presently used architectures and softwares.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENT

An embodiment of the present invention will now be described with reference to the accompanying drawings.

In the present embodiment, an instruction domain register (IDR) and operand domain registers (ODRj) are all of 16 bit configuration. ODRs include a first operand ODR1 (j=1) and a second operand ODR2 (j=2).

Figure 1:
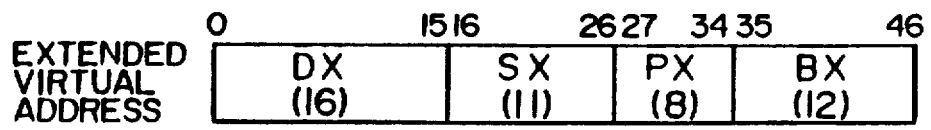
FIG. 1 shows the format of an extended virtual address according to this invention.

FIG. 1 shows the format of an extended virtual address used in this embodiment. The address is assumed to use a 47 bit configuration. 31 bits from the 16-th bit to 46-th bit are the same as the conventional 31 bit virtual address: the segment index (SX) is constructed of 11 bits, the page index (PX) is of 8 bits, and the byte index (BX) is of 12 bits. The segment size is 1 M bytes, and the page size is 4 K bytes. According to the present invention, an additional 16 bit domain index (DX) is added. A virtual address space of 2 G byte size is called herein a virtual domain. Thus, respective ones of $2^{16} = 64$ K of virtual domains are allocated in the virtual address space which is represented by 47 bits. An area represented by DX=d is called herein a virtual domain d.

Prior to giving a description of the embodiment, the address translation where address extension is not made as conventional, and where address extension is made in accordance with the present invention will be described first.

Figure 2:
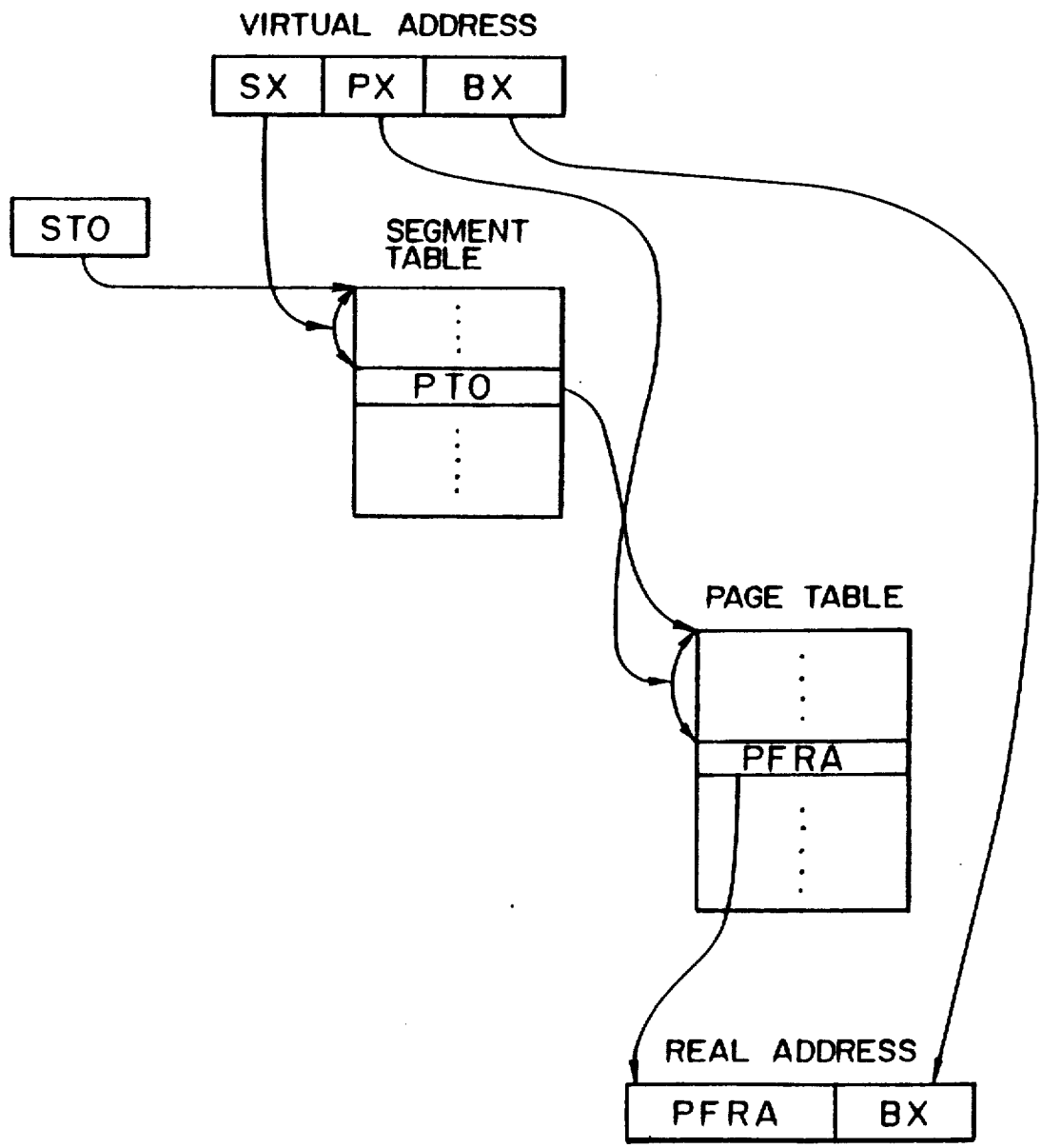
FIG. 2 illustrates a conventional address translation.

FIG. 2 illustrates the address translation where address extension is not made as conventional. A virtual address is composed of a segment index (SX), page index (PX) and byte index (BX). A segment table origin (STO) indicates the start address of a segment table. The segment table origin (STO) is added to the segment index (SX), and the resultant address is used to obtain a page table origin (PTO) from the segment table. The page table origin (PTO) indicates the start address of a page table. The page table origin (PTO) and the page index (PX) are added together, and the resultant address is used to obtain a page frame real address (PFRA) from the page table. A real address is obtained based on the page frame real address and the byte index (BX).

Figure 3:
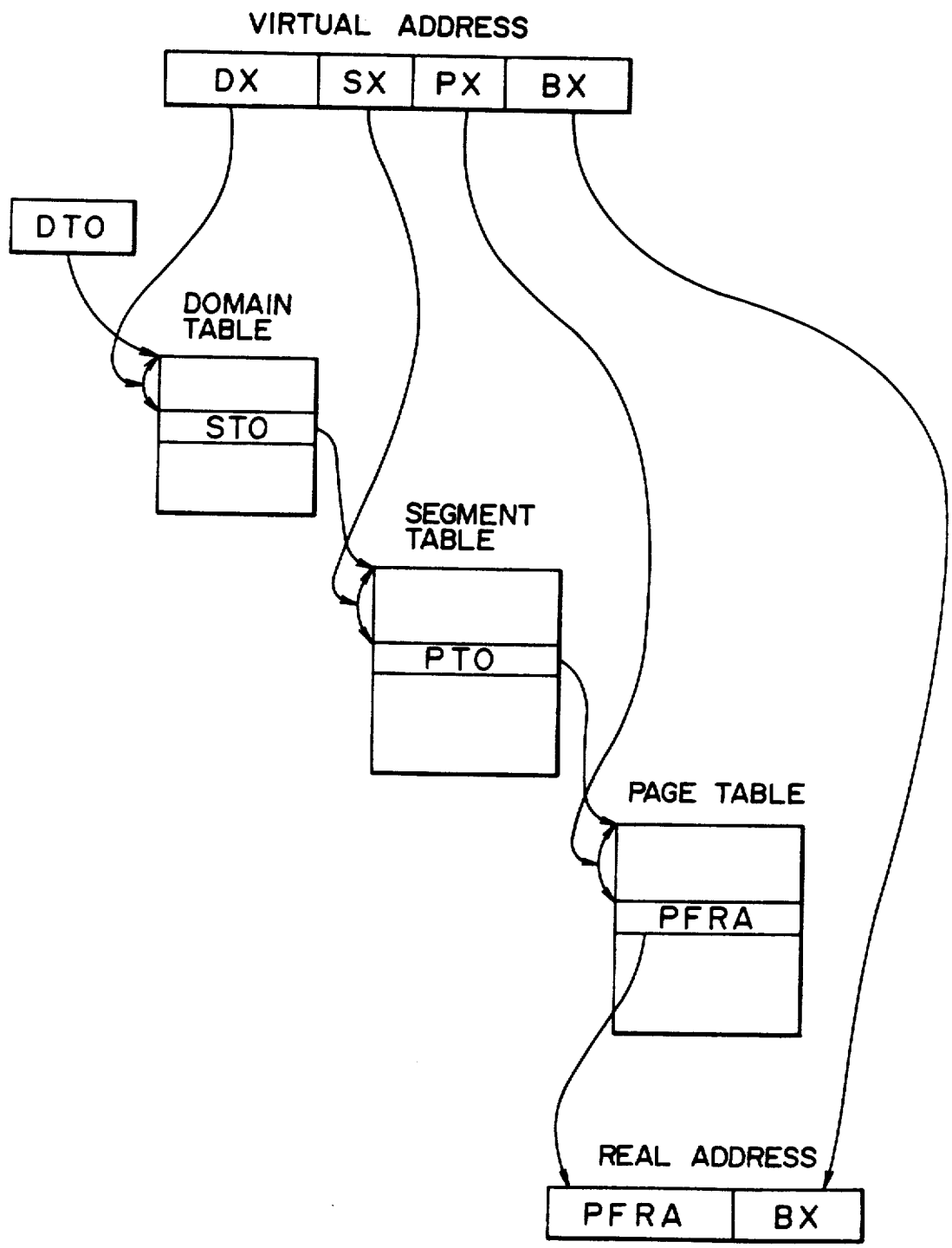
FIG. 3 illustrates an address translation with the address extension according to this invention.

FIG. 3 illustrates the address translation where address extension is made in accordance with the present invention. A virtual address is composed of, as described with FIG. 1, a domain index (DX), segment index (SX), page index (PX), and byte index (BX). A domain table origin (DTO) indicates the start address of a domain table which has been provided in the address translation table. The domain table origin (DTO) and the domain index (DX) are added together, and the resultant address is used to obtain a segment table origin (STO) from the domain table. The segment table origin (STO) indicates the start address of a segment table among a plurality of segment tables. The address translation operation after obtaining the segment table origin (STO) is the same as that described with FIG. 2, so that the description therefor is omitted. In case of the address extension, there are provided domain tables, and segment tables and page tables in correspondence with the extended space.

Figure 4:
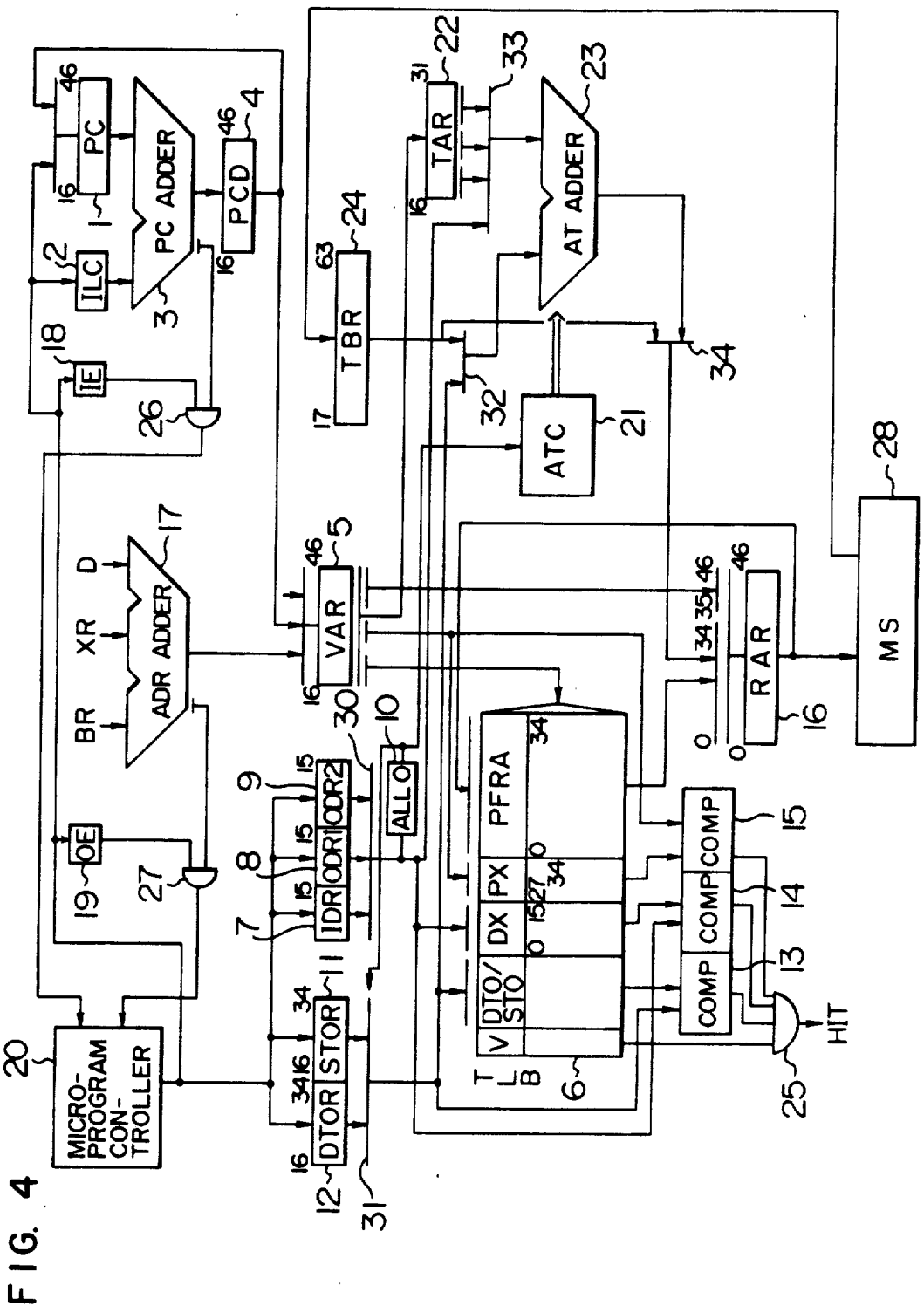
FIG. 4 is a block diagram showing an embodiment of the information processing apparatus according to the present invention.

FIG. 4 is a block diagram showing an embodiment of the information processing apparatus according to the present invention.

First, a memory access for an instruction will be described. An instruction address (31 bits) is being stored in a program counter (PC) 1, and the length of the instruction executed is being stored in an instruction length code register (ILC) 2. The contents of PC 1 and ILC 2 are added together by a PC ADDER 3 to obtain the address of an instruction to be executed next. The addition result is set in an output register (PCD) 4 and in PC 1. The description will be directed to the case where a carry is not generated at such addition operation. The content of PCD 4 is sent to a virtual address register (VAR) 5 for fetching an instruction from the memory. The virtual address set in VAR 5 is composed of the segment index (SX), page index (PX) and byte index (BX), and does not include the domain index (DX), in both the cases where address extension is made and not made. The virtual address is used to refer to an address translation buffer (TLB) 6 in translating the virtual address into a real address. In this embodiment, SX of the virtual address is used as an address to TLB 6. Each entry of TLB 6 includes a V field indicating that the entry concerned is valid; a DTO/STO field for storing a segment table origin (STO) in case where the virtual domain is 0 and storing a domain table origin (DTO) in case where the virtual domain is not 0; a domain index (DX) field; a page index (PX) field, and a page frame real address (PFRA) field. The values of an instruction domain and first and second operand domains are stored in IDR 7, ODR1 8 and ODR2 9 by the information processing apparatus in accordance with the content of a program to be executed. One of the outputs from these three domain registers is selected by a selector 30 dependent upon an instruction fetch, a first operand request or a second operand request. The number or content of selected domain is checked by an all-0 detector 10 if it is 0 or not. If it is 0, a STO register (STOR) 11 is selected, and if not, a DTO register (DTOR) 12 is selected, respectively by a selector 31.

In case of an instruction fetch, IDR 7 is being selected. Comparators 13, 14 and 15 detect the coincidences between IDR 7 and Dx field of TLB 6, between STOR 11 or DTOR 12 and DTO/STO field of TLB 6, and between PX of VAR 5 and PX field of TLB 6. If all the coincidences are detected and V field of the TLB 6 is "1", then an output HIT from an AND gate 25 becomes "1". In this case, it is judged that an objective address translation pair is stored (hit) in TLB 6. Thus, the content of PFRA field of TLB 6 is set at the higher area of a real address register (RAR) 16, and the lower byte index of VAR at the lower area thereof. The real address in RAR 16 is sent to the main storage (MS) 28 to fetch an instruction.

In case where address extension is not made, a program is arranged such that a virtual address of a conventional format is set in VAR 5 to refer to TLB. Thus, a conventional address translation hardware can be used as it is.

Next, a memory request for an operand will be described. An operand address (31 bits) is obtained by adding together the contents of a base register (BR), index register (XR) and displacement (D) by an address adder (ADR ADDER) 17. The addition result is set in VAR 5. The procedure to obtain a real address with reference to TLB 6 is the same as that of the above-described instruction fetch, so the description therefor is omitted. However, only a different point from the instruction fetch is that ODR1 8 (access to the first operand) or ORD2 9 (access to the second operand) is selected in place of IDR 7.

Next, the case where a carry is generated at the address addition operation will be described. An instruction address extended mode bit (IE) 18 and/or operand address extended mode bit (OE) 19 are set at "1" where address extension of the instruction and/or the operand is made, and reset at "0" where address extension is not made, thus serving as discrimination bit. They can be set or reset by a microprogram controller (MPC) 20 upon instruction by a program. If IE 18 is "0" and a carry is outputted from PC ADDER 3, the carry is ignored. If OE is "0" and a carry is outputted from ADR ADDER 17, the carry is also ignored. On the other hand, if IE 18 is "1" and a carry is generated (an over flow occurs) from the highest (leftmost) bit at PC ADDER 3, a signal is sent via an AND gate 26 to MPC 20 to initiate an IDR renewal microprogram and add "1" to the content of IDR 7. Thus, the content of IDR 7 is incremented by "1" and the result is stored therein. In the address translation, the newly stored value in IDR 7 is used. Similarly, if OE 19 is "1" and a carry is generated from the highest bit at ADR ADDER 17, a signal is sent via an AND gate 27 to MPC 20 to initiate an ODR renewal microprogram and add "1" to ODR1 8 for the first operand access and to ODR2 9 for the second operand access. The added result in ODR1 8 or ODR2 9 is used in the address translation. Such addition is carried out by already installed MPC 20. If such addition of "1" to IDR 7, ODR1 8, or ODR2 9 results in generating a carry from the highest (leftmost) bit thereof, then a program interruption is occurred.

The information processing apparatus is provided with an instruction for reading the contents of IDR 7, ODR1 8 and ODR2 9, and an instruction for setting an arbitrary value in these registers so that reading the contents of these registers and setting an arbitrary value in these registers can be carried out by a program.

Next, address translation in the case where an objective address translation pair is not stored in TLB 6 will be described.

If a "HIT" is not gained with respect to TLB 6, an address translation adder (AT ADDER) 23 is activated by an address translation controller (ATC) 21. A signal from the all-0 detector 10 indicating if the content of the domain register IDR 7, ODR1 8, or ODR2 9 is "0" or not is being inputted to ATC 21. If the content of the domain register is "0", address translation of a conventional 31 bit architecture is performed, whereas if it is not "0", extended address translation is performed.

Figure 5:
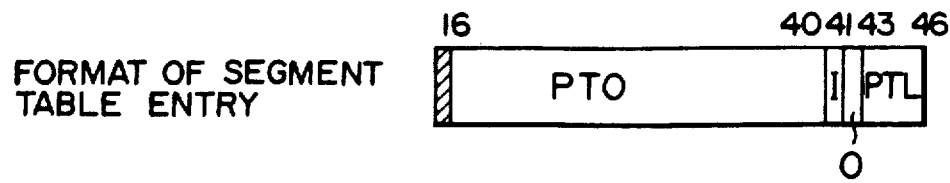
FIG. 5 shows an example of the format of a segment table entry.

First, a conventional address translation will be described. A virtual address to be address translated has been transferred from VAR 5 to a translating address register (TAR) 22. STO in STOR 11 and SX in TAR 22 are supplied via selectors 32 and 33 to an address translation adder (AT ADDER) 23 to add them together, and the added result is set in RAR 16 to address MS 28 using the content of RAR 16 and fetch a segment table from MS 28. An STO entry in ST is set in a table register (TBR) 24. The format of PTO entry is shown in FIG. 5. In addition to STO, the ST entry includes an I bit representative of invalid state, and STL indicative of a segment table length. PTO of the ST entry set in TBR 24 and PX in TAR 22 are added together by AT ADDER 23, and the result is set in RAR 16 to address MS 28 using the content of RAR 16 and fetch a page table (PT) from MS 28. PFRA in the PT entry is stored via a selector 34 in RAR 16, and BX in TAR 22 is stored also in RAR 16 to thereby combine them together and obtain a real address. PFRA in RAR 16, the L contents of STOR 11, and of ODR1 8 or ODR2 9, and PX in TAR 22 are registered in TLB. The V field of the entry in TLB 6 is set at "1" at this time.

As above, if the content of the domain register is "0", a conventional address translation as shown in FIG. 2 is performed so that a conventional address translation program can be used without any modification.

Figure 6:
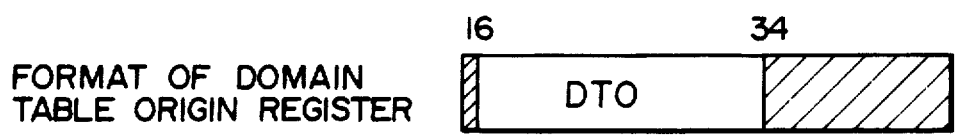
FIG. 6 shows an example of the format of a domain table origin register.
Figure 7:
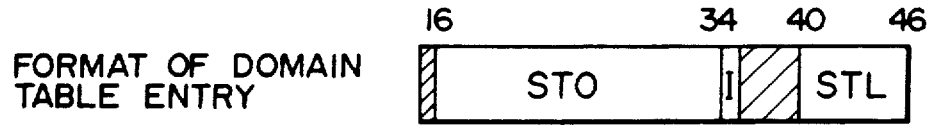
FIG. 7 shows an example of the format of a domain table entry.
Figure 8:
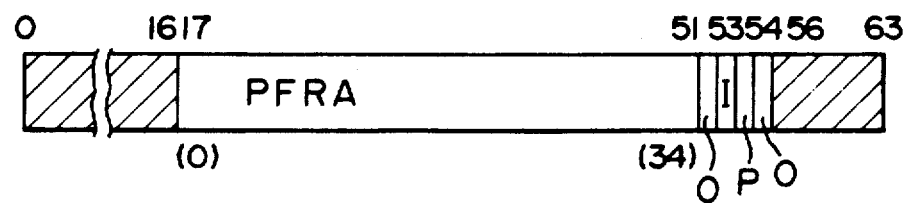
FIG. 8 shows an example of the format of an extended page table entry.

Next, extended address translation where the content of the domain register is not "0" will be described. If the content of the domain register is not "0", not STOR 11 but DTOR 12 is being selected. The format of DTOR 12 is shown in FIG. 6. DTO in DTOR 12 and a domain index from IDR 7, ODR1 8, or ODR2 9 are sent via selectors 31 and 32, and via selectors 30 and 33, to AT ADDER 23 to add them together and obtain an address of a domain table (DT). The DT entry is set in TBR 24. The format of DT entry is shown in FIG. 7 which format is configured as including an invalid bit I, added to the format of segment table (ST) designation of a conventional architecture. STO in the DT entry is used instead of STOR 11 used in a conventional address translation, to thereby perform address translation operation similar to the above-described operation. However, in this case, a conventional address translation refers to two tables ST and PT, whereas an extended address translation refers to three tables DT, ST and PT as shown in FIG. 3. Further, if the real address is also extended, PT should be extended to 8 bytes having the format as shown in FIG. 8. In this case PFRA has 35 bits. The format shown in FIG. 8 includes an $\phi$ bit, invalid bit, and page protection bit P which is used for inhibiting storage into the area indicated by PFRA if it is set at "1". DTOR 12 instead of STOR 11 is registered in TLB 6.

In the above embodiment, the extended address translation has been performed with a three table arrangement. However, a two table arrangement may be applied. Also, the size of segment and page the same as conventional has been used for the domain whose content is not "0". However, for an extended address space in excess of 2 G bytes, the size of segment and page may be changed as different from the conventional one, or the concept of page may not be used to thereby make a segment as the minimum unit in paging/address translating. In such a case, the two table arrangement with DT and ST is applied.

As shown in FIG. 6, DTO is composed of 19 bits so that DT may be allocated in a real address space without real address extension. Further, ST and PT for the extended address area may be allocated in a real address space without real address extension.

An additional instruction is a load instruction to load an arbitrary value in at least IDR 7, ODR1 8 and ODR2 9. If bits not presently used in a program status word (PSW) are used, IE 18 and OE 29 can be set or reset by a load PSW (LPSW) instruction.

The above embodiment allows a use of virtual/real address space in excess of 31 bits and an extension of instruction/data address with a small number of additional hardwares. For instance, even if a virtual/real address is extended to 47 bits as described and shown, only RAR 16 and TBR 24 of the hardwares require 47 bit address, and the additional registers required are DTOR 12, IDR 7, ODR1 8, and ODR2 9, respectively of 16 bit structure, and IE 18 and OE 19 both of 1 bit. PC ADDER 3 and ADR ADDER 17 both are of 31 bit structure as conventional. Further, AT ADDER may be of 31 bit structure as conventional if the address translation table such as a domain table are allocated within the real address space for the case where the domain content is 0.

I claim:

1. An information processing device for executing programs having selectively variable address spaces including a virtual address space and an extended virtual address space, the information processing device comprising:
   address generating means for generating a virtual address, the virtual address having a translatable part and an un-translatable part, the translatable part comprising a segment index and a page index;
   a main storage, communicating with the address generating means, for storing a segment table and a page table, the segment table having an entry holding a page table origin comprising a page table start address and the page table having an entry holding a page frame real address;
   a translation means, communicating with the main storage, for translating the translatable part into a real address by accessing the segment table using a segment table origin stored in a first register and the segment index of the virtual address to obtain the page table origin and accessing the page table using the page table origin and the page index of the virtual address;
   means for accessing the main storage using the real address obtained from the translation means;
   an extended address storage means, communicating with the translation means, for storing an extended address portion, the extended address portion is appended to the virtual address to thereby construct an extended virtual address;
   a domain table in the main storage for storing a plurality of segment table origins;
   a second register means for holding a domain table origin comprising a start address of the domain table in the main storage;
   a plurality of third register means for storing an additional domain table index, one of the third register means being selected by the program, each additional domain table index comprising an extended address portion added to the virtual address to thereby construct the extended virtual address;
   zero detecting means for selectively enabling the virtual address space when a content of the selected third register means is zero, and enabling the extended virtual address space when one of the plurality of third means is not zero;
   means, responsive to the zero detecting means, for selectively obtaining the segment table origin from the first register, for activating the translation means to obtain the real address; and,
   means, responsive to the zero detecting means, for selectively obtaining the domain table origin from the second register means and extended address portion from the selected third register means, respectively, for accessing the domain table by using the domain table origin and the extended address portion to obtain the segment table origin, and for activating the translation means to obtain the real address.

2. An information processing apparatus with an address extension function comprising:
   first register means for holding a segment table origin;
   address register means for storing a virtual address;
   a main storage for storing a plurality of address translation tables each table being identified by a one segment table origin uniquely assigned thereto and an additional table having a plurality of entries each containing the segment table origin;
   a plurality of second register means for storing an extended address portion of an extended virtual address, a one of which is selected by a program performed by the information processing apparatus;
   detection means for selectively detecting a content of the one selected second register means and for selective activation of a virtual address extension, wherein if the content is a predetermined value, virtual address extension is not made, and if the content is not the predetermined value, virtual address extension is made;
   a third register means for storing information comprising an origin address of the additional table in the main storage;
   address translation means for receiving the segment table origin, for accessing an address translation table corresponding to the received segment table origin and for obtaining a real address;
   means, responsive to the detection means, for selectively providing the address translation means with the segment table origin from the first register means to obtain the real address; and,
   means, responsive to the detection means, for selectively accessing the additional table by using the third register means and the one selected second register means to obtain the segment table origin and for providing the address translation means with the obtained segment table origin from the additional table to obtain the real address.

3. The information processing apparatus according to claim 2 further comprising a means for loading the content of at least one of the second register means when a load instruction is issued.

4. The information processing apparatus according to claim 2 further comprising a translation buffer for storing information representative of the origin address of the additional table and information representative of the extended address portion.

* * * * *